United States Patent [19]

Bierbach et al.

[11] 4,049,788
[45] Sept. 20, 1977

[54] THERMAL TRANSFORMATION OF METAL CHLORIDES TO OXIDES IN A FLUIDIZED BED

[75] Inventors: Herbert Bierbach; Heinz Dittmar; Ernst Heinz, all of Frankfurt am Main; Klaus Hohmann, Neuenhain; Rolf Rennhack, Schwalbach, all of Germany

[73] Assignee: Metallgesellschaft Aktiengesellschaft, Frankfurt am Main, Germany

[21] Appl. No.: 623,248

[22] Filed: Oct. 17, 1975

Related U.S. Application Data

[63] Continuation-in-part of Ser. No. 392,995, Aug. 30, 1973, abandoned.

[30] Foreign Application Priority Data

Dec. 14, 1972 Germany .............................. 2261083

[51] Int. Cl.² ...................... C01G 49/02; C01G 53/04; C01G 1/02
[52] U.S. Cl. ..................................... 423/592; 423/633; 423/DIG. 1; 423/DIG. 16
[58] Field of Search ............... 423/632, 633, 481, 488, 423/592, 659 F, DIG. 1; 34/57 A

[56] References Cited

U.S. PATENT DOCUMENTS

| 3,440,009 | 4/1969 | Flood et al. ........................ 423/488 |
| 3,466,021 | 9/1969 | Van Weert et al. ................. 423/633 |
| 3,578,401 | 5/1971 | Uekerle et al. .................... 423/633 X |
| 3,658,483 | 4/1972 | Lienan et al. ..................... 423/481 X |

FOREIGN PATENT DOCUMENTS 1,667,180  6/1971  Germany .............................. 423/633

OTHER PUBLICATIONS

Zenz et al., Fluidization & Fluid Particle Systems, Reinhold Pub. Corp. N.Y. 1960 pp. 230-235, 245-253.

*Primary Examiner*—O. R. Vertiz
*Assistant Examiner*—Brian E. Hearn
*Attorney, Agent, or Firm*—Karl F. Ross

[57] ABSTRACT

A process for the thermal decomposition and conversion of metal chlorides to metal oxides in a fluidized bed wherein the fluidizing gas contains oxygen and the reaction temperature is maintained above the thermal decomposition temperature of the metal chloride but below the sintering temperature of the metal oxide thus produced. The gas velocity is determined by the critical relationship $0.34\rho^{0.9} \leq W_G \leq 0.56\rho^{0.9}$ where $W_G$ is the approximate gas velocity through the fluidized bed chamber in the absence of the bed and $\rho$ is the density of the pure fluidized-bed material (metal oxide). The height of the bed is also critical and should be that at which a critical pressure drop of 1200 to 2400 mm (water column) is obtained but at least 350 mm, measuring with the static or settled bed (nonfluidized).

2 Claims, 1 Drawing Figure

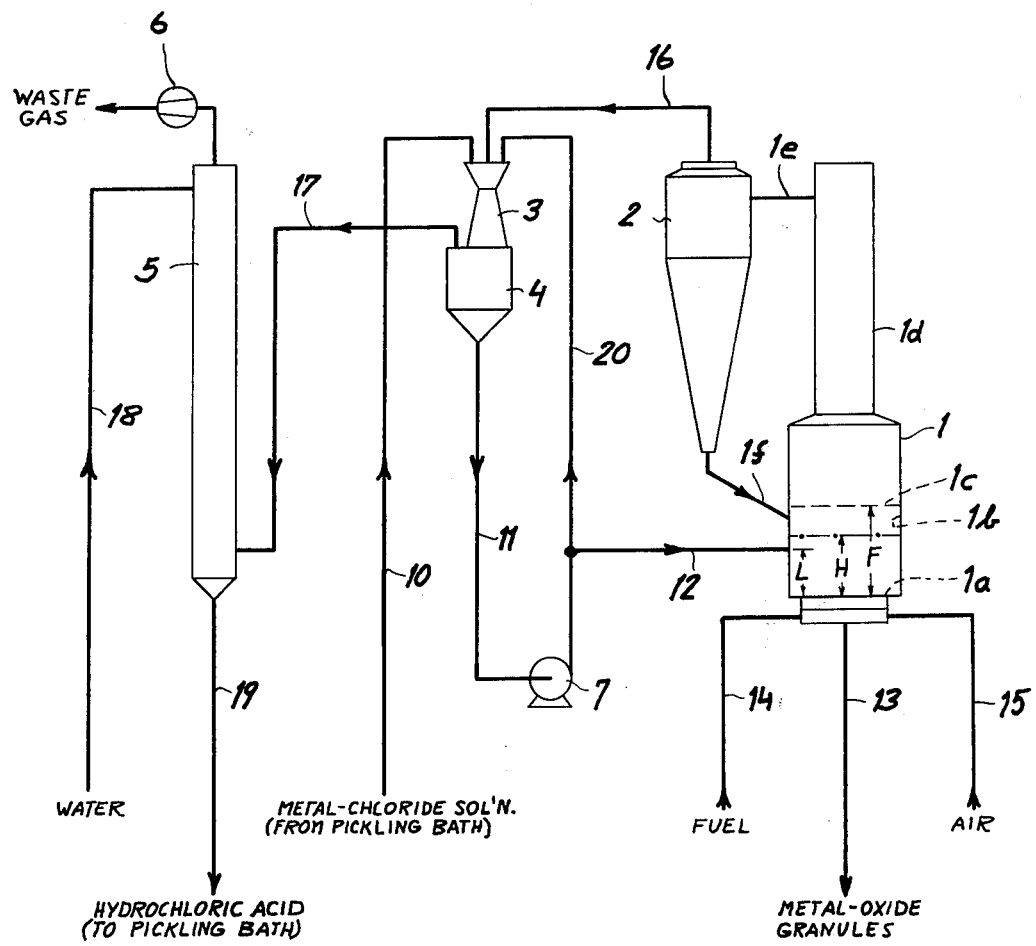

THERMAL TRANSFORMATION OF METAL CHLORIDES TO OXIDES IN A FLUIDIZED BED

CROSS REFERENCE TO RELATED APPLICATION

This application is a continuation-in-part of Ser. No. 392,995 filed Aug. 30, 1973, now abandoned in favor of Ser. No. 609,544 filed Sept. 2, 1975.

FIELD OF THE INVENTION

The present invention relates to a process for the thermal conversion of metal chlorides to metal oxides in a turbulent bed of particulate matter fluidized with an oxygen-containing gas.

BACKGROUND OF THE INVENTION

Numerous metal chlorides can be thermally transformed into metal oxides and hydrogen chloride. In the art it is known to introduce metal chlorides into furnaces in the solid, molten or dissolved state for this purpose. In many cases, the thermal transformation or conversion of metal chlorides is a link in the chain of production of the metal from the metal ore, an ore concentrate or a metallurgical intermediate.

A special case of the thermal decomposition of a metal chloride is the working-up of depleted pickling baths obtained from the pickling of metals with hydrochloric acid.

Among the processes used for the regeneration of such pickling baths is a roasting technique whereby the pickling liquid, arising from the pickling of iron or steel, is sprayed in a hot combustion gas. This technique has, to a large measure, been replaced by a fluidized-bed process. The pickling acid is directly introduced into the fluidized bed or the metal chloride is first crystallized from the pickling acid and is then introduced into the fluidized bed, e.g. in a slurry.

An important advantage of the fluidized-bed technique is that it directly produces a granular, abrasion-resistant dust-free metal oxide with high chloride purity (freedom from chloride). As distinct from the spray-roasting process in which the thermal transformation of the metal chloride to the corresponding metal oxide must be effected with a residence time of only a few seconds, the solid particles of a fluidized bed may remain in the reaction zone for a number of hours to permit the development of metal oxide products of large particle size and to permit complete thermal transformation to the metal oxide.

The importance of obtaining a complete thermal transformation of the metal chloride to the metal oxide has led to domination of fluidized-bed processes in the field of the regeneration of pickling acids.

However, it has not been possible by earlier techniques of operating such fluidized beds to avoid certain disadvantages. For example, when sand constitutes the material of the fluidized bed, a substantial part of the reaction product is a finely divided metal oxide which is entrained out of the fluidized-bed furnace with the reaction gases. The entrained dust particles of metal oxide can be recovered and handled only with difficulty in a dry state. Removal of the fine-particle component by wetwashing and like techniques has the disadvantage that a slurry is produced which can be worked up to recover the metal oxide only with difficulty.

When the fluidized-bed process has been carried out with a metal oxide constituting the solid phase of the bed, continuous operation over a period of several days leads to an increase (growth) in the particle size and a concomitant sharp reduction in the turbulence of the fluidized bed. With the growth of the particles constituting the bed there is an increase in the open or free space in the bed and a reduction in the completeness of the reaction. As a result, a dust-like metal oxide component is produced.

It has hitherto been necessary, with both the metal-oxide and the sand fluidized beds, to pass the effluent dust-containing gas stream through a high-efficiency wet precipitator in which the hot waste gas is brought into direct contact with a metal chloride solution and the latter is thereby concentrated. The resulting effluent product has an increased metal content although some of the oxide remains undissolved. In extreme cases, the proportion of the undissolved oxide dust is so large that difficulties result and interfere with the normal operation of the process. To eliminate the latter disadvantage, it has been proposed to introduce the reaction gas from the fluidized bed into a cyclone to recover a dust which is returned to the fluidized bed. In practice, this arrangement has been found to improve the results only slightly. Control of the particle growth within the bed is generally not possible since, in large measure, the fine particles are continuously carried off before they have achieved the desired increase in size.

OBJECTS OF THE INVENTION

It is the principal object of the present invention to provide a process which avoids the aforementioned disadvantages of conventional systems, and is capable of producing abrasion-resistant granular dust-free metal oxide of high chloride purity (freedom from chloride) without the disadvantages of and the loss in the efficiency of the thermal transformation of metal chlorides as carried out heretofore.

It is a further object of the invention to provide a process for the complete thermal decomposition of metal chlorides preferably obtained as pickling liquors, metallurgically processed byproducts, ores or ore concentrates, which is economical and can be readily controlled to yield abrasion-resistant granular dust-free particles of the metal oxide.

Still another object of the invention is to provide a process for the thermal conversion of a metal chloride to the corresponding metal oxide which can be readily and conveniently regulated to produce, more economically than heretofore, a granular product with a narrow particle size range.

It is also an object to extend the principles of the prior application Ser. No. 392,995.

SUMMARY OF THE INVENTION

These objects and others which will become apparent hereinafter, are attained in accordance with the present invention in a process for the thermal decomposition of metal chlorides in a bed fluidized with oxygen-containing gases and heated, by combustion of a fuel gas or fuel oil, to a temperature above the ignition temperature of the fuel and the decomposition temperature of the metal chloride, but below the sintering temperature of the metal oxide, the reaction producing hydrogen chloride and the metal oxide. The metal oxide is, in major part, withdrawn from the bed below the entry location for the metal chloride.

The metal chloride is introduced at a location below the upper surface or boundary of the fluidized bed ant at a critical distance of at least 250 mm above the entry point of the fluidizing medium in the bed. The turbulencing gas speed has a value $$W_G = (0.34 \text{ to } 0.56)\rho^{0.9}$$

wherein $W_G$ is the turbulencing gas speed in meters per second through the empty reactor and $\rho$ is the density of the pure bed solids in grams per cm³. The "turbulencing gas" is the gas which is in contact with the solids of the bed and is formed by combustion of fuel oil and/or fuel gas, by evaporation of water introduced into the bed (e.g. with the metal chloride) or otherwise found therein, and by chemical reaction with the metal chloride.

The aforementioned relationship means that, when the bed solids are an oxide of the metal whose chloride is introduced into the bed and the density of this metal oxide is higher, the turbulencing gas speed must be greater than the turbulencing gas speed for the processing of metal chlorides whose oxides have lower specific gravity. For example, $Fe_2O_3$ with a density or specific gravity of 5.25 grams per cm³ requires a turbulencing gas speed of 1.5 to 2.5 meters per second.

The relationship given above is, moreover, to be interpreted as meaning the following:

$$0.34\rho^{0.9} \leqq W_G \leqq 0.56\rho^{0.9}$$

i.e. $W_G$ is at least equal to $0.34\rho^{0.9}$ and may reach as much as $0.56\rho^{0.9}$. $W_G$ is given in terms of meters per second as previously noted, while $\rho$ is the solids density of specific gravity in grams per cm³.

The pressure drop which must be established within the critical limits of 1200 to 2400 is proportional to the height of the bed in its rest state and to the bulk specific gravity or density of the material constituting the bed. To achieve a given pressure drop for a material with a given bulk density, it is necessary to adjust the bed height. With higher bulk density, the height of the bed in a rest state is lowered and further production of metal oxides with lower bulk density in a rest state, the height of the bed is increased. The system of the present invention therefore permits thermal transformation of metal oxides of high bulk density with a lower bed height. But in any case the minimum bed height is 350 mm (in the nonfluidized state).

In thermal conversion of iron chloride to form iron oxide with a density of 5.25 grams per cm³, the bed height (in the rest state) should be established at about 350 to 750 mm.

According to another feature of this invention, metal oxide is continuously withdrawn from the fluidized bed. The term "continuously" is here used not only in the sense of an uninterrupted flow of the material from the fluidized bed, but also in the sense of an intermittent withdrawal of increments of the metal oxide from the bed so as to maintain the variation in bed height at a minimum. The metal oxide can be withdrawn periodically, preferably at very short time intervals.

The foregoing parameters and conditions are all critical and must be present in combination.

The invention has been found to be most effective and far more efficient than conventional fluidized-bed processes in that it can operate with a smaller bed height. By introducing the metal chloride, especially a metal chloride solution, below the surface of the bed, the reaction to the metal oxide takes place practically exclusively in the fluidized bed. The major part of water present with the metal chloride (either as the vehicle carrying the metal chloride, a solvent for the metal chloride or water of crystallization) is evaporated very quickly. The residual liquid deposited in a thin layer upon the granules of the bed evaporates, being followed by the thermal decomposition of the metal chloride. The metal oxide thus formed grows simultaneously onto the core of the original grain or granule of the fluidized bed. (This growing up takes place in spite of the fact that the temperature of the bed may lie below the temperature at which metal oxide particles will sinter together since it is in part the result of the formation of the new metal oxide as a molecular growth upon the core. In microscopic examination of the grain it is possible to discern the concentrate shells from which the particle is brought up).

When the surface area of the grain no longer suffices for a complete deposition of the metal chloride upon the grains, the thermal decomposition takes place in part in the space between the individual grains and forms dust which is entrained from the fluidized bed.

Therefore one had to assume that it was necessary to increase the bed height for a constant reactor diameter and production rate, in order to increase the residence time of the particles to permit them to grow to larger sizes. But with an increase in the height of the bed, there is a sharp increase in the growth of the oxide particles and, at least in part, this growth is so strong that the solids at the bottom of the bed may cake up and may be subjected to reduction in the region of localized fuel excess. In addition, formation of dust of extreme fineness is observed and the separation of the dust in a cyclone downstream of the fluidized bed and return of the dust to the latter is economically not feasible. When attempts were made to eliminate these disadvantages by simply increasing the gas velocity, the loose bed permitted a substantial entrainment of the metal oxides formed in the bed with the reactor gases and thereby overloading the particle-removal apparatus.

We have found, as noted, that in reducing the bed height, in introducing the metal chloride at a selected level and in providing a selected turbulencing gas velocity, metal oxides with a particle size within relatively narrow limits are obtained while permitting continuous operation over long periods.

The primarily formed particles on cracking either are so large that they remain directly in the fluidized bed and grow, or are precipitated out in the cyclone stage downstream of the bed and are returned to the fluidized bed for agglomeration to larger particles. Substantially all newly formed metal oxide takes part in the particle growth and all withdrawn particles are replaced by fresh fine-grain particles formed in the fluidized bed. The results described are indeed surprising in view of the general belief in the art that increased bed heights are necessary to obtain particles of a satisfactory size range. In fact a change in the bed velocity pressure drop or bed height causes severe deviation in the particle size distribution.

According to an important feature of this invention, the metal chloride is a hydrometallurgical product obtained from leaching of a metal from a solid by hydrochloric acid. The liquid may also be a pickling liquor obtained by treating metals with hydrochloric acid. Best results have been obtained with solutions derived in this manner and containing iron, nickel, cobalt, aluminum, magnesium, manganese or chromium as the chloride. Best results are obtained with iron chloride solutions in particular if the solution is obtained in a pickling process.

The metal chloride can be introduced into the bed in the solid, molten or liquid form or in a mixture or slurry. For example, when the metal chloride is to be used as a solid, it may be crystallized from one of the liquids described above by evaporation and entrained into the bed in a gaseous vehicle or by slurrying it in a liquid which itself may be a saturated solution of the metal chloride. Alternatively, the metal chloride solution may be evaporated to dryness and then heated to melt the compound which is introduced into the bed in a molten state.

The operating temperature, according to the invention, has an upper limit which is substantially the point at which the metal oxide tends to sinter and a lower temperature which is the ignition temperature of the fuel or the decomposition temperature of the metal chloride, whichever is higher. For iron chloride a temperature of about 800° C is preferred.

DESCRIPTION OF THE DRAWINGS

The above and other objects, features and advantages of the present invention will become more readily apparent from the following description, reference being made to the accompanying drawing in which the sole FIGURE is a flow diagram illustrating a plant for carrying out the process of the present invention.

SPECIFIC DESCRIPTION

The plant illustrated in the drawing for the thermal transformation of, for example, iron chloride to iron oxide, comprises a fluidized-bed reactor 1 which is diagrammatically shown to have a grate 1a, a cylindrical fluidized-bed chamber 1b in which a fluidized bed having an upper level 1c in the fluidized state is maintained, and an effluent outlet duct 1d leading effluent gases away from the fluidized bed.

The term "fluidized bed" is used herein to define a mass of solid particles in turbulent motion as induced by an upward flow of gas (fluidizing gas) through a particle mass. This bed, when not fluidized and when settled (static bed) is merely a layer having a height H represented in dot-dash lines in the drawing. However, when a fluidizing gas is forced upwardly through the bed of particles, it induces a turbulent movement in the mass which sets the particles circulating in vortices between the grate or perforated plate 1a through which the fluidizing gas is introduced and a level 1c which is more or less well defined and above which all particles are swept with the effluent gases from the chamber.

The fluidized-bed reactor has its outlet duct 1d connected at 1e to a cyclone-type dry-particle separator 2 (Chapter 20, pages 68-74 of *Perry's Chemical Engineers' Handbook*, published by McGraw-Hill Book Co, New York, 1963). A return duct 1f delivers the solid phase from this separator to the bed within the reactor 1. The gas outlet of cyclone 2 is connected to a venturi scrubber 3 in which additional solid components are removed by wet separation methods (Chapter 18 of *Perry's Chemical Engineers' Handbook*, Pages 53-56), the solids being collected in a settling chamber 4 from which a slurry can be pumped via line 11 and pump 7. A portion of this slurry can be returned to the fluidized bed as represented at 12 while another portion is recycled to the venturi scrubber 3 via line 20.

The scrubbed exhaust gas is carried by line 17 from the venturi scrubber 3 to an absorber 5 to which wash water is delivered at 18 so that the hydrogen chloride contained in the gas is recovered as hydrochloric acid at outlet 19. The residual gas, free from hydrogen chloride, is discharged by a blower 6 which maintains the entire system above the fluidized bed substantially under subatmospheric pressure.

The fluidized-bed reactor 1 is provided with an outlet 13 from which the particles of metal oxide are removed to maintain the level 1c constant, while lines 14 and 15 are provided to introduce the fuel and fluidizing gas (air) respectively. The fluidized beds of Chapter 20, Pages 3 and 42-53 of *Perry's Chemical Engineers' Handbook* may be used. The absorber 5 may be of the type described in Chapter 14 of *Perry's Chemical Engineers' Handbook*.

In operation, the metal chloride slurry or solution is delivered by a line 10 to the ventury scrubber 3 and is there brought into contact directly with the hot gases recovered from the fluidized bed reactor 1 and the cyclone 2. The metal chloride solution is thereby heated, a portion of the water evaporated and the resulting slurry is conducted via line 11, pump 7 and line 12 into the fluidized bed at a level L at least 250 mm above the nozzle plate of grate 1a of the reactor. The balance of the slurry is recirculated to the ventury scrubber via line 20 and, of course, the quantity of metal chloride introduced into the reactor is adjusted by varying the proportions carried by lines 12 and 20.

The fluidized bed, which has a minimum height H (350 mm) in the static condition, comprises particles of the metal oxide of the metal to be recovered and is fluidized to a height of F represented by the level 1c by the introduction of the fluidizing gas from line 15 and fuel from line 14, combustion being effected in the fluidized bed; the temperature in the latter is maintained within a range as described above, whereby residual water from the metal chloride is evaporated and the metal chloride is transformed into hydrogen chloride and metal oxide as previously described.

The fully grown metal oxide particles (granules) are withdrawn via line 13 at a rate corresponding to the rate of introduction of the metal chloride at 12 so that the fluidized bed has a practically constant height. The gaseous effluent from the reactor is delivered to the cyclone 2 from which the major portion of the entrained solids are recovered and returned to the fluidized bed below the level thereof so that they may, in turn, grow to the size of the desired granules.

The heated reaction gases are recovered from the cyclone via line 16 and contain hydrogen chloride, water vapor and combustion products (in addition to inert nitrogen from the air) and minor quantities of fine oxide dust. The dust is removed in the high-efficiency venturi scrubber which serves simultaneously for the recovery of metal oxide from the exhaust gases. The slurry withdrawn at 11 therefore, is preheated by the exhaust gases, contains the metal oxide dust stripped from the exhaust gases, and is in part concentrated by the exhaust gas. The degree of concentration is, of course, a function of the degree of recirculation of the metal chloride solution via line 20.

The cool gas, which is withdrawn at 17 from the vessel 4, contains hydrogen chloride which is removed in the absorber 5 to which fresh water or a recirculated liquor is delivered via line 18, the acid being recovered at 19 for use in a pickling process.

SPECIFIC EXAMPLES
EXAMPLE I

In a plant of the type shown in the drawing, having a cylindrical fluidized bed reactor with a height of 4 meters (m) and a diameter of 1.8 m, an iron chloride solution is thermally converted to iron oxide. The solution, containing 150 grams per liter (g/l) iron, is introduced at a rate of 1.5 cubic meters per hour (m³/h).

The gas velocity is 1.97 m/sec., as measured over the cross-section of the empty reactor, the gas consisting of combusting gas, combustion products, vaporization products and reactant gases as described previously. The height of the fluidized bed (in its nonfluidized state) is about 520 mm and the bed consists of particles of $Fe_2O_3$. The iron chloride solution is introduced at a height of 400 mm above the location at which the oxygen-containing gas is introduced and the temperature within the fluidized bed is substantially constant at about 800° C.

The iron oxide produced by the thermal reaction is substantially free of dust and chloride and is withdrawn from the fluidized reactor at a rate of substantially 320 kg/h, the intervals of withdrawal being about 30 minutes. The bulk density of the product, depending upon the overall operating conditions, ranges between 3.2 and 3.5 g/cm³. The particle distribution or spectrum of the fluidized bed is given in Table I below and is found to be stable when the system is operated for long periods without requiring changes in the parameters given above.

TABLE I

| Particle diam. (mm) | Particle Size Distribution (wt%) for Indicated Operating Times | | | | |
|---|---|---|---|---|---|
| | 0 hrs | 48 hrs | 65 hrs | 82 hrs | 100 hrs |
| > 1.6 | 3.7 | 0.4 | 0.3 | — | — |
| 1.6 – 1.0 | 2.5 | 5.0 | 11.6 | 10.0 | 5.7 |
| 1.0 – 0.63 | 12.5 | 92.7 | 47.9 | 23.9 | 10.3 |
| 0.63 – 0.4 | 11.3 | 1.9 | 1.3 | 3.1 | 14.3 |
| 0.4 – 0.2 | 62.5 | — | 8.9 | 39.9 | 61.2 |
| < 0.2 | 7.5 | — | 30.0 | 23.1 | 8.5 |

EXAMPLE II

In a reactor having a height of 4 m and a diameter of 2.3 m, 4.5 m³/h of an iron chloride solution with an iron content of 109 g/l was transformed to iron oxide. The preconcentrated iron chloride solution was introduced into the bed below the surface thereof and at height of 380 mm above the location at which the oxygen containing gas was introduced. The bed height, in the now fluidized state, was 480 mm (approximate) and was held constant by the continuous removal of iron oxide granules. The bed was composed of iron oxide particles and was fluidized by a gas consisting of a mixture of oxygen and nitrogen (from air), combustion products from the burning of fuel in the gas, evaporated water and reaction-product gas (hydrogen chloride), the gas velocity being 2.17 m/sec as calculated over the empty reactor. The temperature of the fluidized bed was maintained constant at about 800° C. About 700 kg/h of iron oxide were withdrawn which, as in Example I, were free of dust and chloride, and a bulk density in the range of 3.2 to 3.5 g/cm³ and the spectrum (substantially constant over the operation of the apparatus) as given in Table II below. Trace elements found in the pickling bath from which the iron chloride solution was drawn, including calcium, aluminum, chromium and manganese were separated out without difficulty.

TABLE II

| Particle Diam. (mm) | Size Dist. (wt%) for Indicated Operating Times | | | | |
|---|---|---|---|---|---|
| | 0 hrs | 24 hrs | 48 hrs | 72 hrs | 96 hrs |
| > 1.68 | 3.4 | 5.4 | 3.3 | 2.4 | 1.9 |
| 1.68 – 1.0 | 32.2 | 31.1 | 21.8 | 13.8 | 9.0 |
| 1.0 – 0.6 | 40.8 | 33.5 | 30.5 | 40.2 | 47.7 |
| 0.6 – 0.425 | 15.1 | 17.7 | 26.1 | 24.5 | 22.1 |
| 0.425 – 0.25 | 7.1 | 10.1 | 14.2 | 13.6 | 15.1 |
| < 0.25 | 1.4 | 2.2 | 4.1 | 5.5 | 4.2 |

EXAMPLE III

In a smaller reactor having a height of 4.0 m and a diameter of 0.5 m, a nickel chloride solution is thermally transformed into the nickel oxide. The nickel chloride solution was introduced into a fluidized bed of nickel oxide at a rate of 46.5 l/h with a nickel concentration of 220 g/l. The concentrated solution was introduced at a level of 500 mm above the grate of the fluidized bed, but below the top of the bed which had a height (in the non-fluidized state) of about 620 mm. The bed was maintained at a temperature of about 950° C and the gas velocity, determined across the cross-section of the empty reactor was 2.14 m/sec. The granules of nickel oxide, withdrawn at a rate of 13 kg/h, were free of dust and chloride, had a uniform round from and were of the particle size distribution set forth in Table III. The bulk density was 3.7 to 3.8 g/cm³.

TABLE III

| Particle diam. (mm) | Particle Size Dist. (wt%) for indicated operating periods | | | | |
|---|---|---|---|---|---|
| | 0 hrs | 15 hrs | 35 hrs | 46 hrs | 60 hrs |
| > 1.2 | — | — | 2.0 | 6.0 | 7.4 |
| 1.2 – 0.6 | 25.0 | 50.5 | 84.0 | 80.6 | 42.3 |
| 0.6 – 0.23 | 74.0 | 49.3 | 14.0 | 13.3 | 39.1 |
| < 0.23 | 1.0 | 0.2 | — | 0.7 | 11.2 |

EXAMPLE IV

Example 1 of German Offenlegungsschrift No. 1,667,180 was repeated for purposes of comparison. The calculated gas velocity was about 1.4 m/sec and the fluidized bed height (in static, settled and nonfluidized state) was about 1 m. When the process was carried out discontinuously, i.e. operated for a day and then terminated, the process was capable of operating substantially unobjectionably. However, with continuous operation over a period equivalent to those at which Examples I–III hereof were carried out, a progressive nonuniform turbulence developed and was accompanied by increased dust production and the formation of a product with progressively increasing chloride content. When the bed height was reduced to 0.6 m (in a static, settled and nonfluidized state) and the velocity of the gas increased to 1.87 m/sec, approaching the requirements of the gas velocity relationship given above in accordance with this invention the disadvantages were eliminated. The increased gas velocity corresponded to an increase in the flow rate of the fluidizing gas from 180 m³/h to 240 m³/h (standard temprature and pressure). The output of the apparatus was thereby increased from 36.5 l/h to 49 l/h of preconcentrated pickling liquor containing 180 g/l iron. The fuel requirement (fuel oil) increased from 11.9 kg/h to 16 kg/h. The improved iron oxide product had a bulk density between 3.0 and 3.5 g/cm³ and was free from dust particles and substantially free from chloride by contrast with the system of the German Offenlegungsschrift. The particle size distribution is given in Table IV below.

TABLE IV

| Particle Diam. (mm) | Particle Size Dist. (wt%) for indicated operating periods | | | | |
|---|---|---|---|---|---|
| | 0 hrs | 36 hrs | 72 hrs | 108 hrs | 144 hrs |
| > 2.0 | 2.1 | 7.1 | 2.0 | — | — |
| 2.0 – 1.5 | 24.3 | 39.0 | 5.8 | 1.1 | — |
| 1.5 – 1.0 | 38.9 | 42.3 | 12.6 | 6.8 | 7.6 |
| 1.0 – 0.75 | 12.2 | 6.4 | 26.5 | 19.0 | 13.8 |
| 0.75 – 0.5 | 19.7 | 3.9 | 12.2 | 23.5 | 33.3 |
| 0.5 – 0.3 | 2.7 | 1.3 | 16.7 | 37.4 | 43.4 |
| < 0.3 | 0.1 | — | 24.2 | 12.2 | 1.9 |

We claim:

1. A process for the thermal conversion of a metal chloride to a metal oxide comprising the steps of:

forming a fluidized bed of particles of said metal oxide having height minimum oxygen-containing of 350 mm in a nonfluidized state of the bed within a fluidized-bed chamber;

fluidizing said bed by introducing at the bottom of said chamber of free oxygen-containing fluidizing gas at a velocity so that reaction gases are obtained having a velocity $W_G$, determined by the relationship $0.34\rho^{0.9} \leq W_G \leq 0.56\rho^{0.9}$ where $\rho$ is the density of the metal oxide in g/cm³, and $W_G$ is the velocity in meters/second measured in the empty reactor, the reaction gases being the resulting gases produced by combustion of the fuel with the fluidizing free-oxygen-containing gas, gases produced by evaporation of water or thermal release of water from a feed containing the metal chloride, and gases produced by chemical reaction with the metal chloride;

maintaining said fluidized bed at the height upon fluidization thereof such that the pressure drop across said bed is between 1200 and 2400 mm (water column);

introducing said metal chloride in solution into said bed at a location at least 250 mm above the entrance of the fluidizing gas and below the top of the fluidized bed;

maintaining the fluidized bed at a temperature between the thermal reaction temperature of the metal chloride for formation of the metal oxide and the temperature at which the metal oxide particles sinter together, said metal oxide being selected from the group which consists of iron oxide and nickel oxide, said metal chloride being selected from the group which consists of iron chloride and nickel chloride, said bed having a height in a nonfluidized state of substantially 350 to 750 mm for the iron oxide and 350 to 650 mm for the nickel oxide and said temperature ranging between substantially 800° C and 1100° C.;

recovering from said bed an effluent gas containing hydrogen chloride and metal oxide particles;

separating metal oxide particles from said effluent gas in a cyclone and returning the metal oxide particles separated from said effluent gas in the cyclone to said bed below the top of the fluidizing bed; scrubbing the effluent gas flowing separation of oxide particles therefrom in said cyclone, in a venturi scrubber with a liquor containing metal chloride in solution thereby concentrating the metal chloride in said liquor and entraining residual metal oxide particles from said effluent gas, said liquor being fed to said bed from said scrubber; and substantially continuously withdrawing metal oxide granules from said bed at said bottom of said chamber at a rate sufficient to maintain the top of said bed at a constant level, said metal chloride in solution being continuously introduced into said bed.

2. The process defined in claim 1 wherein said metal chloride is introduced into said bed at a location of at least 500 mm above the entrance of the fluidizing gas and below the top of the fluidized bed.

* * * * *

UNITED STATES PATENT AND TRADEMARK OFFICE
CERTIFICATE OF CORRECTION

PATENT NO. : 4,049,788
DATED : 20 September 1977
INVENTOR(S) : Herbert BIERBACH; Heinz DITTMAR; Ernst HEINZ, Klaus HOHMANN; Rolf RENNHACK.

It is certified that error appears in the above-identified patent and that said Letters Patent are hereby corrected as shown below:

<u>Claim 1</u>, line 4 (column 9, line 23)
for "having height minimum oxygen-containing of 350" read -- having a minimum height of 350 -- ;

<u>Column 10</u>, line 16, after "iron" cancel semicolon (;) .

Signed and Sealed this

Second Day of May 1978

[SEAL]

Attest:

RUTH C. MASON
Attesting Officer

LUTRELLE F. PARKER
Acting Commissioner of Patents and Trademarks